US 8,403,288 B2

(12) United States Patent
Cheng

(10) Patent No.: US 8,403,288 B2
(45) Date of Patent: Mar. 26, 2013

(54) SUPPORTING MECHANISM AND DEVICE USING THE SAME

(75) Inventor: Quan-Chang Cheng, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/244,404

(22) Filed: Sep. 24, 2011

(65) Prior Publication Data

US 2012/0187259 A1    Jul. 26, 2012

(30) Foreign Application Priority Data

Jan. 25, 2011  (CN) .......................... 2011 1 0027431

(51) Int. Cl.
*A47G 29/00* (2006.01)
(52) U.S. Cl. .................... 248/688; 248/673; 248/677
(58) Field of Classification Search ............. 248/188.6, 248/188.8, 292.12, 447, 454–456, 469, 474, 248/476, 479, 673, 677, 686, 688, 922, 923
See application file for complete search history.

(56) References Cited

U.S. PATENT DOCUMENTS

| | | | | | |
|---|---|---|---|---|---|
| 2,456,720 | A | * | 12/1948 | Miles | 40/747 |
| 5,329,712 | A | * | 7/1994 | Keller | 40/747 |
| 6,014,829 | A | * | 1/2000 | Wilson et al. | 40/753 |
| D663,294 | S | * | 7/2012 | Buxton | D14/250 |
| 2007/0062089 | A1 | * | 3/2007 | Homer et al. | 40/754 |
| 2007/0138369 | A1 | * | 6/2007 | Chang et al. | 248/688 |

* cited by examiner

*Primary Examiner* — Gwendolyn Baxter
(74) *Attorney, Agent, or Firm* — Altis Law Group, Inc.

(57) ABSTRACT

A supporting mechanism for supporting a device includes a rotating member rotatably coupled to the device, and a supporting member rotatably coupled to the rotating member and being foldable on the device. The rotating member is capable of being rotated from a first position to a second position. When the rotating member is rotated to a first position, the unfolded supporting member supports the device in a first orientation; when the rotating member is rotated to a second position, the supporting member supports the device in a second orientation different from the first orientation. A device having the supporting mechanism is also provided.

19 Claims, 5 Drawing Sheets

SUPPORTING MECHANISM AND DEVICE USING THE SAME

BACKGROUND

1. Technical Field

The present disclosure relates to devices, and particularly to a device using a supporting mechanism.

2. Description of Related Art

Hand-held electronic devices, such as PDAs, MP3s, and mobile phones, for example, are widely used. However, most of these hand-held electronic devices do not have a supporting mechanism. When a hand-held electronic devices are used to watch movies or read e-books, the users need to physically hold the device, which is inconvenient.

Therefore, there is room for improvement in the art.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
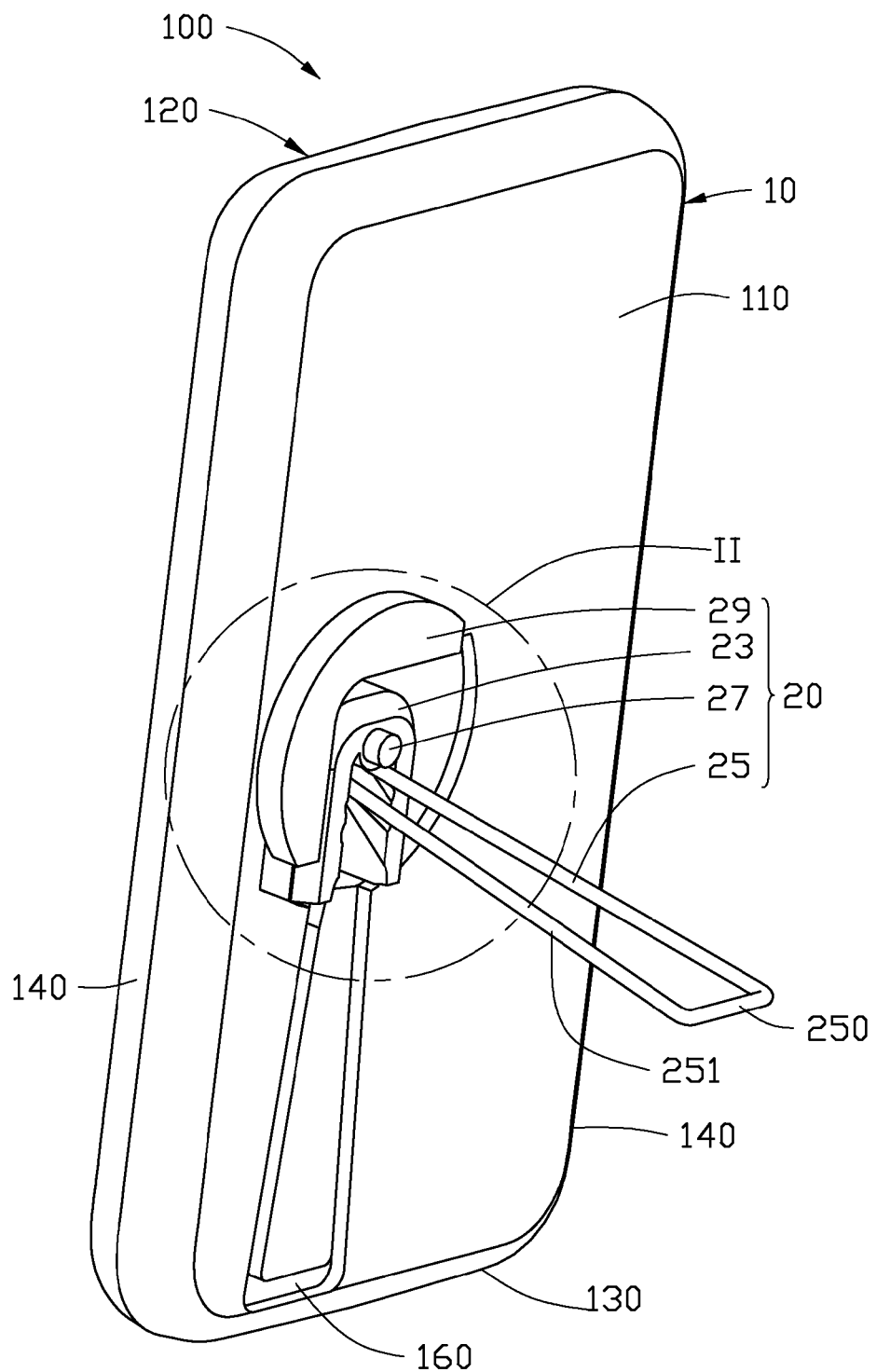
FIG. 1 is a perspective view of a device having a supporting mechanism in accordance with an embodiment.

Referring to FIG. 1, a device 100 in accordance with an embodiment is shown. The device 100 includes a main body 10 and a supporting mechanism 20 mounted to the main body 10. The main body 10 may be an electronic device or may be the shell of an electronic device. In the embodiment, the main body 10 is the shell of an electronic device 200 (see FIG. 4). The electronic device 200 may be a mobile-phone, a personal digital assistant (PDA), PSP and other hand-held electronic devices. The supporting mechanism 20 operates to support the main body 10 in a number of different orientations such as sideways or vertically.

The main body 10 is substantially rectangular, and includes a back wall 110, a front wall 120, and first sidewalls 130 and second sidewalls 140. The front wall 120 defines a receiving space 122 (see FIG. 3) for receiving the electronic device 200. The back wall 110 recesses to form a receiving portion 150 (see FIG. 3), and further defines a U-shaped slot 160 communicating with the receiving portion 150.

Figure 2:
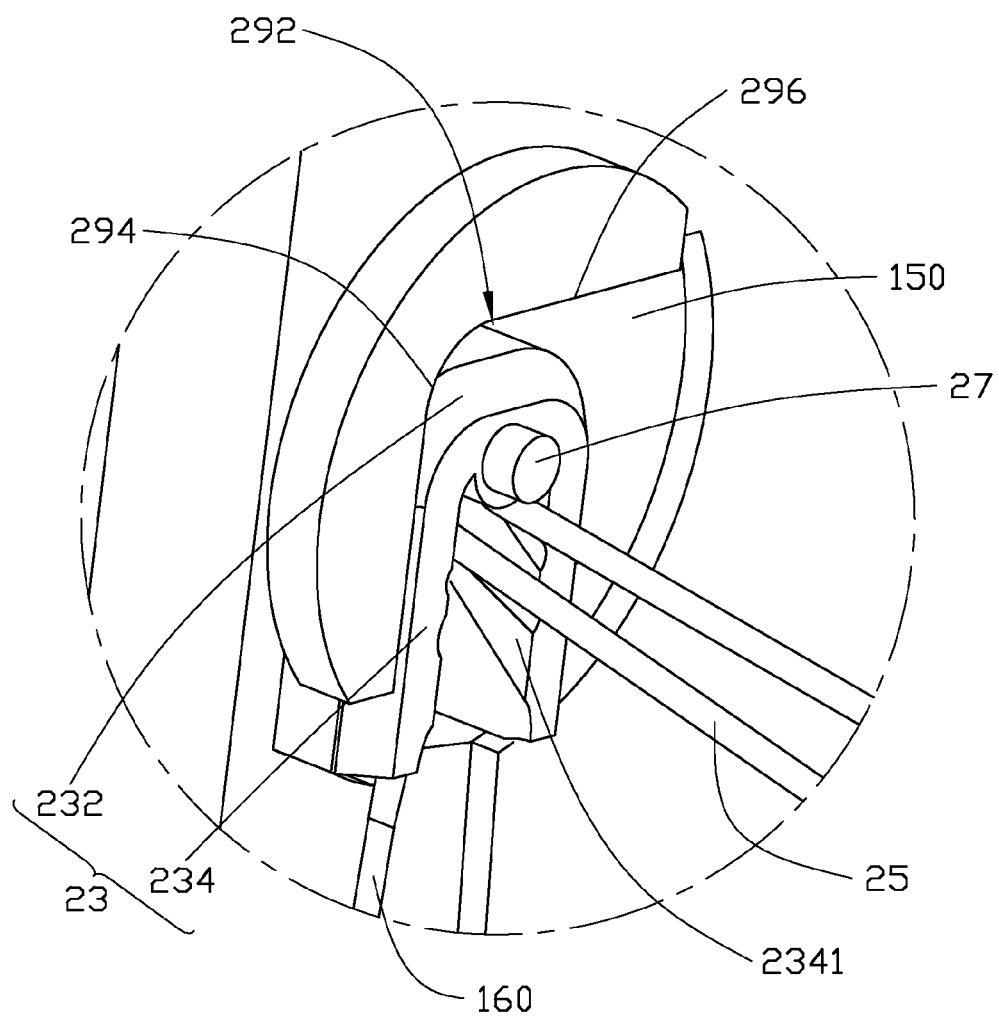
FIG. 2 is a partially enlarged view of the portion II of the device of FIG. 1.

Referring also to FIG. 2, the supporting mechanism 20 is mounted to the back wall 110 of the main body 10, and includes a rotating member 23 rotatably coupled to the back wall 110, a supporting member 25 rotatably coupled to the rotating member 23, a post 27 and a stopping member 29.

The supporting member 25 is substantially U-shaped and matches the U-shaped slot 160. The supporting member 25 is made of metal, and is capable of being elastically deformed. The supporting member 25 includes a cylindrical supporting portion 250 and two arms 251 extending from the supporting portion 250. The proximate ends of the arms 251 are cranked away from each other to form two axially-aligned pivoting rods 252 (see FIG. 3). The two pivoting rods 252 are substantially parallel to the supporting portion 250.

Figure 3:
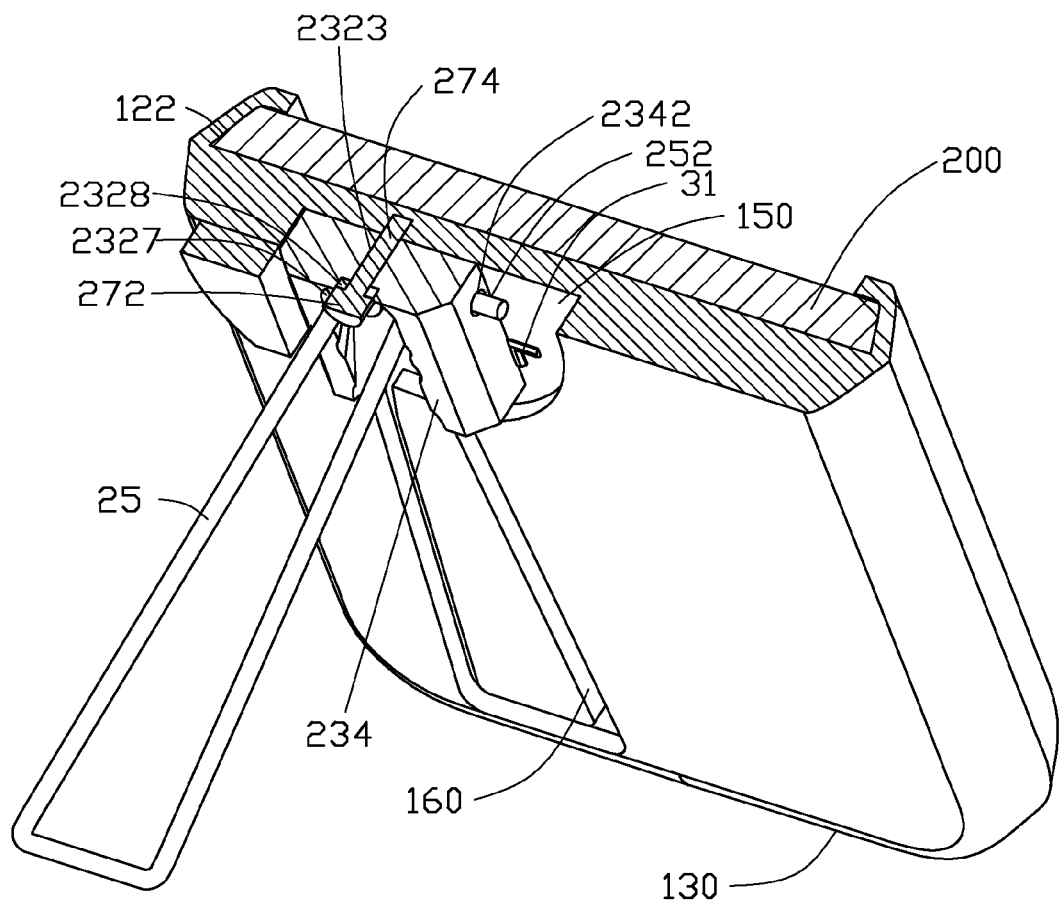
FIG. 3 is a cross-sectional view of FIG. 1.

The rotating member 23 is substantially U-shaped, and is rotatably received in the receiving portion 150. The rotating member 23 includes a base 232 and two extending portions 234 respectively extending from two opposite ends of the base 232. Referring to FIG. 3, the middle of the base 232 defines a substantially round recess 2327. The bottom of the recess 2327 further defines a through hole 2323 extending through the base 232. The ends of the extending portions 234 adjacent to the base 232 respectively define a round hole 2342. The two round holes 2342 receive and hold captive the pivoting rods 252, such that the supporting member 25 is rotatably coupled to the rotating member 23. The internal sides of the extending portions 234 define a plurality of limiting grooves 2341. The limiting grooves 2341 extend in several radial directions. When the supporting member 25 is rotated relative to the rotating member 23, the limiting grooves 2341 operate to position the supporting member 25 in different positions.

The post 27 is fixed to the bottom of the receiving portion 150, and includes a head portion 272 and a cylindrical portion 274 (see FIG. 3). The diameter of the head portion 272 is substantially less than the size of the recess 2327, but is greater than the size of the through hole 2323. The diameter of the cylindrical portion 274 is almost the same as the size of the through hole 2323, such that friction is present to hinder the smooth and free rotation of the rotating member 23. The cylindrical portion 274 extends through the recess 2327 and the through hole 2323 and is fixed to the bottom of the receiving portion 150, whereby the rotating member 23 is rotatably coupled to the back wall 110. The distance between the head portion 272 and the bottom of the receiving portion 150 is greater than the distance between the bottom of the recess 2327 and the bottom of the receiving portion 150, thus, a clearance 2328 is defined between the head portion 272 and the bottom of the recess 2327 to allow the rotating member 23 to move a certain distance along the cylindrical portion 274.

The stopping member 29 is fixed to the back wall 110, and is arranged adjacent to the receiving portion 150. A portion of the stopping member 29 forms a cutout 292. The cutout 292 includes a first wall 294 perpendicular to the first sidewalls 130 and a second wall 296 perpendicular to the first wall 294. When the rotating member 23 rotates around the post 27, the first wall 294 stops the rotating member 23 in a first position with the extending portion 234 parallel to the second sidewalls 140, and the second sidewall 296 stops the rotating member in a second position perpendicular to the first position.

The supporting mechanism 20 further includes a limiting member 31 (see FIG. 3). The limiting member 31 is integral with or secured to the bottom of the receiving portion 150, and is used to provide a barrier to prevent the rotating member 23 from moving when the rotating member 23 is located in one of the first or second positions.

In assembly, first, the post 27 is inserted through the recess 2327 and the through hole 2323, and is fixed to the bottom of the receiving portion 150, thus, the rotating member 23 is rotatably coupled to the main body 20. Second, the pivoting rods 252 are manipulated into the round holes 2342, such that the supporting member 25 is rotatably coupled to the rotating member 23. Third, the stopping member 29 is fixed to the back wall 110 with the first wall 294 perpendicular to the first sidewalls 130 and the second sidewall 296 perpendicular to the second sidewalls 140. Finally, the limiting member 31 is secured to the bottom of the receiving portion 150 if not integrally manufactured with it.

Referring to FIGS. 1 and 3, to support the device 100 on a flat surface: the supporting member 25 is pulled out from the slot 160, to be positioned in a desired position and held in place by means of the limiting grooves 2341. As a result, the supporting member 25 keeps an angle with the back wall 110, and cooperates with one of the first sidewalls 130 to support the device 100 in a longitudinal or sideways orientation.

Figure 4:
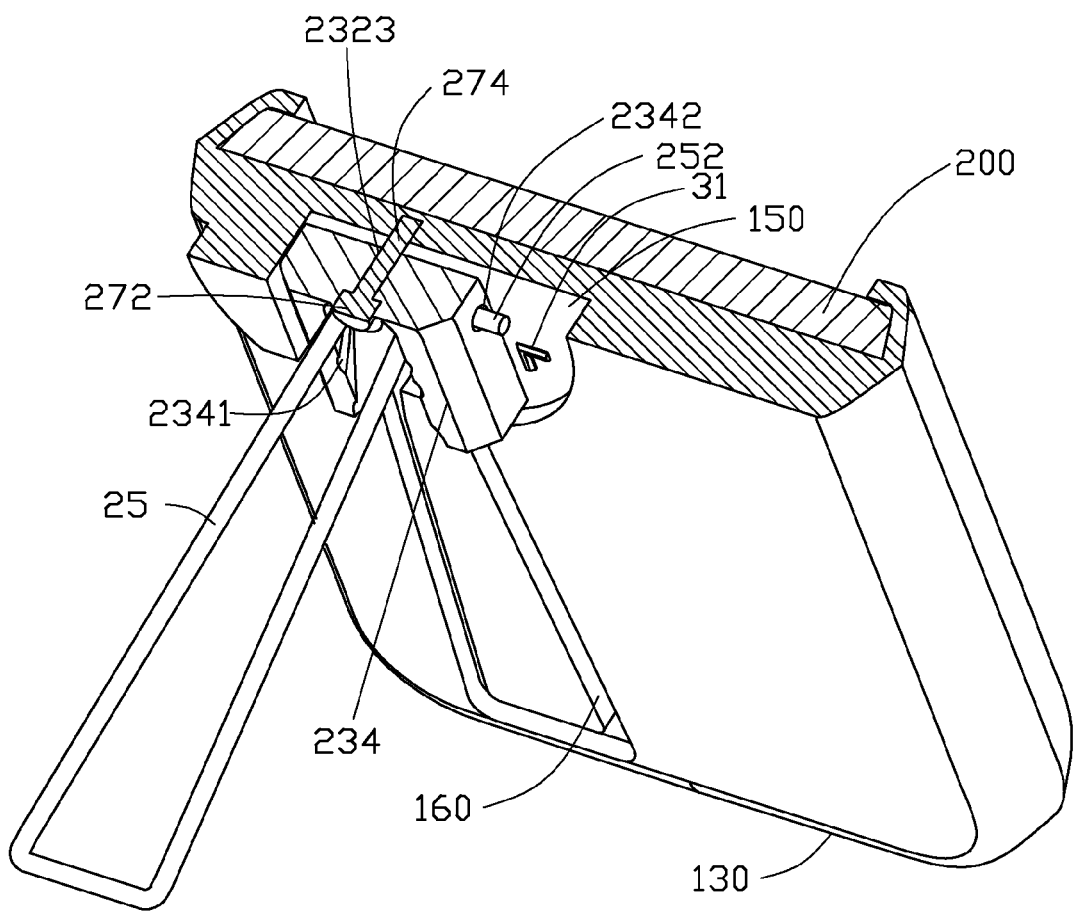
FIG. 4 is a perspective view showing the device of FIG. 3 after the supporting mechanism has been turned through a quarter of a circle.
Figure 5:
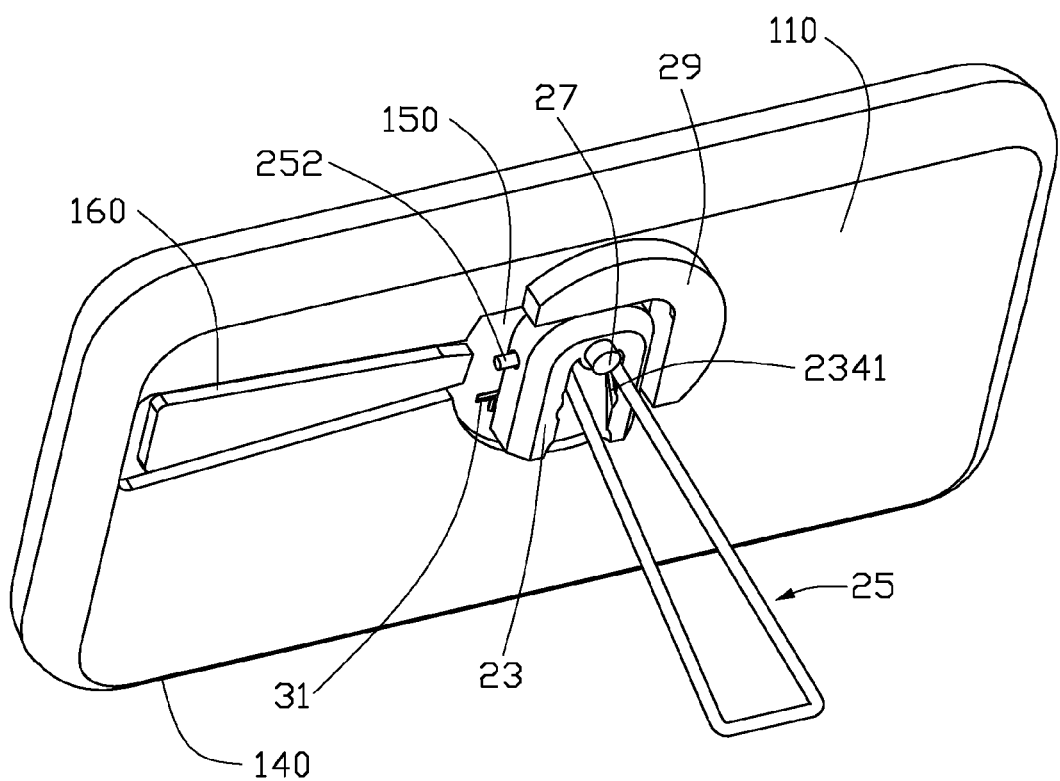
FIG. 5 is a perspective view showing the device of FIG. 1 supported in another orientation.

Referring to FIG. 4, when the supporting member 25 is lifted further away from the back wall 110, to slide the rotating member 23 toward the head portion 272, whereupon the rotating member 23 may overcome the limiting member 31 and be rotated from the first position to the second position. Referring also to FIG. 5, after the rotating member 23 has been rotated to the second position, the rotating member 23 is pressed against the bottom of the receiving portion 150 and is again limited to the second position by the limiting member 31, and the supporting member 25 is adjusted to achieve the desired angle with the back wall 110 by being limited in one of the limiting grooves 2341. As a result, the supporting member 25 cooperates with one of the second sidewalls 140 to support the device 100 in an upright or vertical orientation.

When the device 100 is not being used, the rotating member 23 may be rotated to the first position, and the supporting member 25 retracted in the slot 160.

With the assistance of the supporting mechanism 20, the device 100 may be supported in different orientations.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A supporting mechanism for supporting a device, the device comprising a first sidewall and at least one second sidewall different from the first sidewall, the supporting mechanism comprising:
   a rotating member rotatably coupled to the device, and capable of being rotated from a first position perpendicular to the first sidewall to a second position perpendicular to the at least one second sidewall; and
   a supporting member rotatably coupled to the rotating member and being foldable on the device;
   wherein when the rotating member is rotated to the first position, the supporting member is unfolded and cooperates with the first sidewall to support the device in a first orientation; when the rotating member is rotated to the second position, the supporting member is unfolded and cooperates with the at least one second sidewall to support the device in a second orientation different from the first orientation;
   wherein the supporting mechanism further comprises a limiting member fixed to the device, the limiting member resists the rotating member to prevent the rotating member from moving when the rotating member is located in one of the first and second positions;
   wherein the rotating member comprises a base and two extending portions respectively extending from ends of the base, ends of the extending portions adjacent to the base define two round holes, the supporting member is rotatably coupled to the rotating member via the round holes.

2. The supporting mechanism as described in claim 1, wherein internal sides of the extending portions defines a plurality of limiting grooves, the limiting grooves extends in different direction and used to position the supporting member in different positions.

3. The supporting mechanism as described in claim 2, wherein the supporting member is capable of being elastically deformed.

4. The supporting mechanism as described in claim 1, further comprising a stopping member, the stopping member comprising a first wall perpendicular to the first sidewall and a second wall perpendicular to the first wall, the first wall used for stopping the rotating member in the first position, and the second wall used for stopping the rotating member in the second position.

5. The supporting mechanism as described in claim 1, further comprising a post for rotatably securing the rotating member to the device, the post providing a clearance for allowing the rotating member to slide along the post to overcome the limiting member.

6. The supporting mechanism as described in claim 5 wherein friction is generated between the rotating member and the post to prevent the rotating member sliding along and rotating around the post.

7. A device comprising:
   a main body comprising a first sidewall and at least one second sidewall; and
   a supporting mechanism for supporting the device in a first orientation and in a second orientation different from the first orientation, wherein the supporting mechanism comprises:
      a rotating member rotatably coupled to the device, and capable of being rotated from a first position perpendicular to the first sidewall to a second position perpendicular to the at least one second sidewall; and
      a supporting member rotatably coupled to the rotating member and being foldable on the device;
      a stopping member secured to the main body, the stopping member comprising a first wall perpendicular to the first sidewall and a second wall perpendicular to the first wall, the first wall used for stopping the rotating member in the first position, and the second wall used for stopping the rotating member in the second position;
   wherein when the rotating member is rotated to the first position, the supporting member is unfolded and cooperates with the first sidewall to support the device in the first orientation; when the rotating member is rotated to the second position, the supporting member is unfolded and cooperates with the at least one second sidewall to support the device in the second orientation; wherein the rotating member comprises a base and two extending portions respectively extending from ends of the base, ends of the extending portions adjacent to the base define two round holes, the supporting member is rotatably coupled to the rotating member via the round holes.

8. The device as described in claim 7, wherein the back wall of the main body defines a receiving portion for rotatably receiving the rotating member.

9. The device as described in claim 8, wherein the back wall of the main body further defines a slot communicating with the receiving portion, the slot is used for receiving the supporting member.

10. The device as described in claim 7, wherein internal sides of the extending portions defines a plurality of limiting grooves, the limiting grooves extends in different direction and used to position the supporting member in different positions.

11. The device as described in claim 10, wherein the supporting mechanism further comprises a limiting member fixed to the bottom of the receiving portion, the limiting member used to resist against the rotating member to prevent the rotating member from moving when the rotating member is located in one of the first and second positions.

12. The device as described in claim 11, wherein the supporting mechanism further comprises a post for rotatably securing the rotating member to the device, the post providing a clearance for allowing the rotating member to slide along the post to overcome the limiting member.

13. The device as described in claim 11, wherein friction is generated between the rotating member and the post to prevent the rotating member sliding along and rotating around the post.

14. The device as described in claim 10, wherein the supporting member is capable of being elastically deformed.

15. A supporting mechanism for supporting a device, the device comprising a first sidewall and at least one second sidewall different from the first sidewall, the supporting mechanism comprising:
a rotating member rotatably coupled to the device, and capable of being rotated from a first position perpendicular to the first sidewall to a second position perpendicular to the at least one second sidewall; and
a supporting member rotatably coupled to the rotating member and being foldable on the device;
wherein when the rotating member is rotated to the first position, the supporting member is unfolded and cooperates with the first sidewall to support the device in a first orientation; when the rotating member is rotated to the second position, the supporting member is unfolded and cooperates with the at least one second sidewall to support the device in a second orientation different from the first orientation; and
wherein the supporting mechanism further comprises a limiting member fixed to the device and a post for rotatably securing the rotating member to the device; the limiting member resists the rotating member to prevent the rotating member from moving when the rotating member is located in one of the first and second positions; the post is used to provide a clearance for allowing the rotating member to slide along the post to overcome the limiting member.

16. The supporting mechanism as described in claim 15, wherein the rotating member comprises a base and two extending portions respectively extending from ends of the base, ends of the extending portions adjacent to the base define two round holes, the supporting member is rotatably coupled to the rotating member via the round holes.

17. The supporting mechanism as described in claim 16, wherein internal sides of the extending portions defines a plurality of limiting grooves, the limiting grooves extends in different direction and used to position the supporting member in different positions.

18. The supporting mechanism as described in claim 15, further comprising a stopping member, the stopping member comprising a first wall perpendicular to the first sidewall and a second wall perpendicular to the first wall, the first wall used for stopping the rotating member in the first position, and the second wall used for stopping the rotating member in the second position.

19. The supporting mechanism as described in claim 15, wherein friction is generated between the rotating member and the post to prevent the rotating member sliding along and rotating around the post.

* * * * *